UNITED STATES PATENT OFFICE.

S. T. JONES, OF NEW YORK, N. Y.

IMPROVEMENT IN THE MANUFACTURE OF IRON.

Specification forming part of Letters Patent No. 8,357, dated September 16, 1851.

*To all whom it may concern:*

Be it known that I, SAMUEL T. JONES, of the city, county, and State of New York, have invented certain new and useful Improvements in the Manufacture of Iron from its Ores, or in the finery, boiling, puddling, &c., of crude or pig iron; and I do hereby declare that the following is a full, clear, and exact description thereof.

My invention consists in the application of the ore called "Franklinite" to the preparation or manufacture of iron from its ores, or in the finery, boiling, puddling, &c., of crude or pig iron. The ore called "Franklinite," hitherto only found in considerable quantities in the vicinity of Franklin furnace, Sussex county, in the State of New Jersey, contains, according to Berthier and according to Thompson:

|  | Berthier. | Thompson. |
|---|---|---|
| Peroxide of iron | 66 | 66.100 |
| Oxide of zinc | 17 | 17.425 |
| Sesquioxide of manganese | 16 | 14.960 |
| Silica |  | 0.204 |
| Water |  | 0.560 |
|  | 99 | 99.249 |

A portion of the oxide of zinc is mechanically mixed with the ore, and by the way of distinction is usually called "free zinc," while another portion is more intimately blended with the iron and manganese, and is called the "chemically-combined" portion of the zinc.

Hitherto the franklinite has not been deemed of much value for smelting purposes, owing to the difficulties attending its reduction; but I have found by experiment that when admixed with other impure ores of iron in the Catalan forge, or with pig or crude iron of hot-short or cold-short qualities arising from admixture of sulphur, phosphorus, silica, or other impurities in the puddling or boiling furnace, these imperfections may be wholly removed, or otherwise the quality of the iron frequently benefited by it.

In effecting the process of purification the so-called "chemically-combined" portion of the zinc performs an important part, owing to its lesser tendency to volatilize than that of the free zinc under high temperature, whereby it is detained in contact with the ore or iron to be improved until a more complete improvement is effected, while the other oxides of iron and manganese contribute their aid also by attacking the carbonaceous matters and combined carbon contained in the pig-metal or otherwise mixed with the ore. The franklinite may be broken to about the size of a walnut or less, and charged into the Catalan forge along with the iron ore to be improved in proportions varying from five per cent. or more, according to the effects intended on the various qualities of the ores or the resulting iron intended to be produced or improved by it.

In some kinds of ores—such as bog ores—partaking largely of phosphorus and silica, I have found five per cent. only to produce a marked improvement, and that a further addition, equal to fifteen per cent. in the whole, has produced an iron of a remarkably superior quality, while other ores have required a larger proportion.

In the puddling or boiling furnace, when charged in along with the pig-metal, I have found that in some kinds of the latter which produce finished iron of the hot-short or cold-short qualities the franklinite charged with it in the proportion of five per cent. to the weight has entirely removed the latter defect, while ten per cent. was required to remove the former. In other instances large proportions, varying up to twenty per cent. or more have been required, and I have thereby frequently obtained from inferior pig-metal the best quality of refined iron, such as is adapted to the manufacture of horseshoe-nails and other purposes requiring the best qualities of iron.

The proportions to be applied must necessarily depend in a great degree on the qualities of the ore or pig-metal to be operated upon, and which the experience of the workman can alone determine.

In the puddling or boiling process the franklinite should, in order to produce the best effect, be broken to a size not exceeding that of a coarse powder. It may be charged in at the same time with the cinder and pig-metal, or subsequently, just after the fusion of the latter, and before it rises to the point of fermentation. The former period is the most convenient to the workmen; but as the free zinc in this case is apt to sublime in part before the pig-metal arrives at a state of fusion the latter may be attended with a greater degree of economy. The more thoroughly it is worked into or intermingled with the fused mass the greater will be the advantage resulting from its use. In all operations where franklinite or other iron ores containing zinc, or where zinc ores or metallic zinc is used, either for the reduction or for the improvement or galvanization of iron at high temperatures, there must be a considerable volatilization and waste of the fumes in the state of oxide, &c. These may be collected and saved by the employment of suitable receivers in connection with the furnace.

Having thus fully described the nature of my invention, what I claim as new therein, and desire to secure by Letters Patent, is—

The application of franklinite to the improvement of iron in the process of reduction from its ores and in the finery or puddling of coarse or pig iron according to the method as above described.

S. T. JONES.

Witnesses:
C. AUSTIN MONROE,
WM. H. BISHOP.